US012798103B2

(12) United States Patent
Takada et al.

(10) Patent No.: US 12,798,103 B2
(45) Date of Patent: Nov. 17, 2026

(54) FOOLPROOF DEVICE AND STORAGE MEDIUM

(71) Applicant: MITUTOYO CORPORATION, Kanagawa (JP)

(72) Inventors: Akira Takada, Kanagawa (JP); Mitsuru Fukuda, Tochigi (JP); Hirotada Anzai, Tochigi (JP); Eran Yeruham, Tel-Mond (IL); Yuval Yeruham, Tel-Aviv (IL); David Bunimovich, Kadima (IL)

(73) Assignee: MITUTOYO CORPORATION, Kanagawa (JP)

( * ) Notice: Subject to any disclaimer, the term of this patent is extended or adjusted under 35 U.S.C. 154(b) by 377 days.

(21) Appl. No.: 18/386,829

(22) Filed: Nov. 3, 2023

(65) Prior Publication Data

US 2024/0149461 A1 May 9, 2024

(30) Foreign Application Priority Data

Nov. 7, 2022 (JP) ................................ 2022-178042

(51) Int. Cl.
*B25J 9/16* (2006.01)
*G01B 11/00* (2006.01)

(52) U.S. Cl.
CPC ........... *B25J 9/1697* (2013.01); *B25J 9/1653* (2013.01); *B25J 9/1687* (2013.01); *G01B 11/005* (2013.01)

(58) Field of Classification Search
CPC ........ G01S 7/4817; G01S 17/08; G01S 17/46; G01S 17/931; G01S 17/89; B25J 19/022; B25J 9/1697; B25J 9/1653; B25J 9/1687; G01B 11/2518; G01B 11/026; G01B 11/2527; G01B 11/2536; G01B 11/005
See application file for complete search history.

(56) References Cited

U.S. PATENT DOCUMENTS 4,054,281 A * 10/1977 Martinsson ........... B25B 1/2468 269/118
10,960,536 B2 3/2021 Ishikawa et al.
2002/0184755 A1* 12/2002 Suhara ............... H05K 13/0069 29/739

(Continued)

FOREIGN PATENT DOCUMENTS

CN 111781894 10/2020
JP 11-179635 7/1999

(Continued)

*Primary Examiner* — Michelle M Iacoletti
*Assistant Examiner* — Jarreas Underwood
(74) *Attorney, Agent, or Firm* — Greenblum & Bernstein, P.L.C.

(57) ABSTRACT

A foolproof device provided to a manufacturing process includes an imaging part that captures an object on which a plurality of identifiable marks are provided, an image processing part that obtains state data including a coordinate position of each mark from at least one captured image captured by the imaging part, a storage that stores reference data obtained by the image processing part, the reference data including a reference position of each mark, and a comparison processing part that compares the reference data stored in the storage with the current state data obtained by the image processing part, and outputs a result of the comparison regarding at least some of the plurality of marks.

12 Claims, 10 Drawing Sheets

(56) References Cited

U.S. PATENT DOCUMENTS

| | | | | |
|---|---|---|---|---|
| 2012/0038936 | A1* | 2/2012 | Ahn | G03F 7/70791 356/616 |
| 2018/0354130 | A1 | 12/2018 | Preisinger et al. | |
| 2019/0168378 | A1 | 6/2019 | Ishikawa et al. | |
| 2020/0306982 | A1* | 10/2020 | Itou | B25J 9/1697 |
| 2020/0345572 | A1* | 11/2020 | Cooke | A61B 5/702 |

FOREIGN PATENT DOCUMENTS

| | | |
|---|---|---|
| JP | 2010-117754 | 5/2010 |
| JP | 2016-38716 | 3/2016 |
| JP | 2019-100904 | 6/2019 |
| JP | 2019-169003 | 10/2019 |
| JP | 2020-163518 | 10/2020 |

* cited by examiner

FOOLPROOF DEVICE AND STORAGE MEDIUM

CROSS-REFERENCE TO RELATED APPLICATIONS

The present application claims priority to Japanese Patent Applications number 2022-178042, filed on Nov. 7, 2022 contents of which are incorporated herein by reference in their entirety.

BACKGROUND OF THE INVENTION

The present disclosure relates to a foolproof device and a storage medium.

When measuring a workpiece (object) with a measuring device in a manufacturing process, the workpiece is delivered to a predetermined position of the measuring device by a robot arm and is measured by a probe or the like. The workpiece is fixed to a base part by a clamp in advance, and a robot arm carries the base part to deliver the workpiece (see Japanese Unexamined Patent Application Publication No. 2019-100904).

Conventionally, an operator visually checks a state of a workpiece and a state of a fixing jig that fixes the workpiece during the process. Therefore, the operator may overlook the state of the workpiece or the fixing jig even when it deviates from a desired state, in which case the workpiece cannot be appropriately measured or machined.

BACKGROUND OF THE INVENTION

The present disclosure focuses on this point, and an object thereof is to enable an operator or the like to easily grasp whether or not an object is appropriately located in a desired state.

A first aspect of the present disclosure provides a foolproof device provided to a manufacturing process, including an imaging part that captures an object on which a plurality of identifiable marks are provided, an image processing part that obtains state data including a coordinate position of each mark from at least one captured image captured by the imaging part, a storage that stores reference data obtained by the image processing part, the reference data including a reference position of each mark, and a comparison processing part that compares the reference data stored in the storage with the current state data obtained by the image processing part, and outputs a result of the comparison regarding at least some of the plurality of marks.

A second aspect of the present disclosure provides a storage medium storing a program for causing a processor to execute the steps of causing an imaging part to capture an object on which a plurality of identifiable marks are provided, obtaining state data including a coordinate position of each mark from at least one captured image captured by the imaging part, and comparing reference data including a reference position of each mark stored in a storage with the current state data obtained and outputting a result of the comparison regarding at least some of the plurality of marks.

DESCRIPTION OF THE PREFERRED EMBODIMENTS

Hereinafter, the present disclosure will be described through exemplary embodiments of the present disclosure, but the following exemplary embodiments do not limit the disclosure according to the claims, and not all of the combinations of features described in the exemplary embodiments are necessarily essential to the solution means of the disclosure.

<Outline of Foolproof System>

A configuration of a foolproof system according to the present embodiment will be described with reference to FIGS. 1 and 2.

Figure 1:
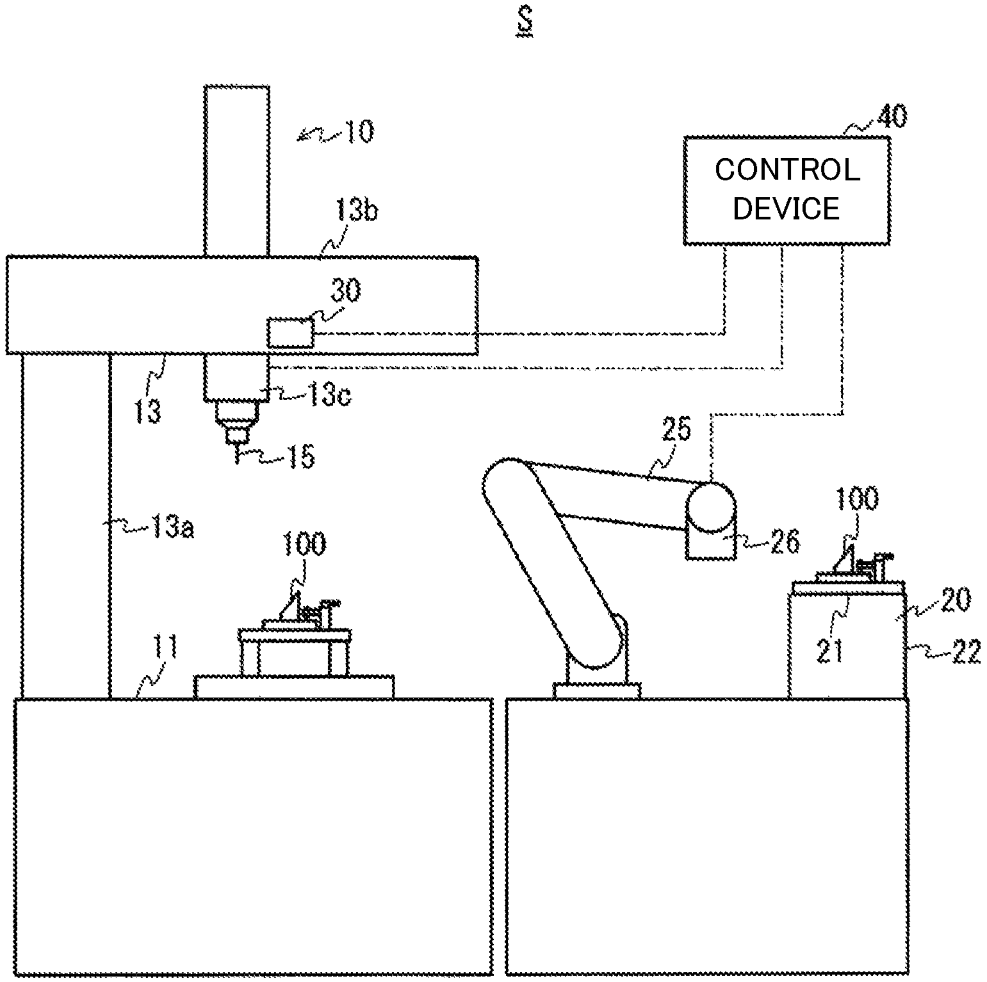
FIG. 1 is a schematic diagram illustrating a configuration of a foolproof system S.

FIG. 1 is a schematic diagram illustrating a configuration of a foolproof system S. The foolproof system S is a system for preventing operational errors or the like by operators in a manufacturing process. In the present embodiment, the foolproof system S is applied to a measuring process where a workpiece is measured, but the present disclosure is not limited thereto, and for example, the foolproof system S may be applied to a machining process where the workpiece is machined. Foolproofing is a mechanism for preventing operational errors provided to an operation process such as a production line, which, for example, prevents next process to be performed if an operational error occurs. The foolproof system S includes a measuring device 10, a stocker 20, a robot arm 25, an imaging device 30, and a control device 40. The foolproof system S here delivers a workpiece 100 set to the stocker 20 to the measuring device 10 for measurement.

The measuring device 10 is a coordinate measuring device that measures coordinates of the workpiece 100. By measuring the coordinates of the workpiece 100, dimensions and geometries of the workpiece 100 can be measured. The measuring device 10 includes a placement surface 11, a moving mechanism 13, and a detection part 15.

The placement surface 11 is a top surface of a surface plate, on which the workpiece 100 to be measured is placed. The moving mechanism 13 is a mechanism for moving the detection part 15, and includes a column 13*a*, a beam 13*b*, and a spindle 13*c*. The column 13*a* is erected on the placement surface 11, and supports the beam 13*b*. The beam 13*b* is a beam-shaped member orthogonal to the column 13*a*, and is movable with respect to the column 13*a*. The spindle 13*c* is a prismatic member and is movably connected to the beam 13*b*.

The detection part 15 is provided at the tip of the spindle 13*c* and detects three-dimensional coordinates of the workpiece 100. The detection part 15 here includes a contact probe that contacts a surface of the workpiece 100, but is not limited thereto. For example, the detection part 15 may be a non-contact probe that detects a distance by radiating a laser beam onto the surface of the workpiece 100.

Figure 2:
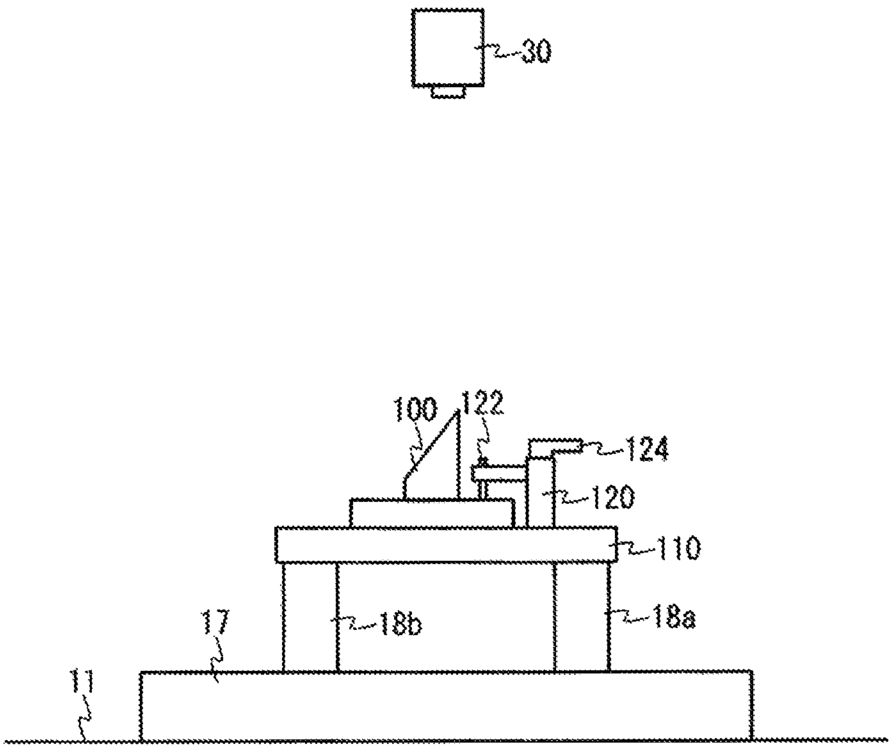
FIG. 2 schematically shows a placement state of a workpiece 100 on a placement surface 11.

FIG. 2 schematically shows a placement state of the workpiece 100 on the placement surface 11. The workpiece 100 is previously fixed to a base plate 110, which is a base part, by a clamp 120. The clamp 120 fixes the workpiece 100 to the base plate 110 by using a fixing part 122 when a lever 124, which is a movable portion, is operated. Thus, the workpiece 100 being fixed to the base plate 110 is placed on the placement surface 11. In the present embodiment, the base plate 110 and the clamp 120 function as a fixing jig for fixing the workpiece.

A fixing plate 17 is fixed to the placement surface 11. The fixing plate 17 is provided with a plurality of support shafts 18*a* and 18*b* protruding from a top surface of the fixing plate 17. The support shafts 18*a* and 18*b* can support the base plate 110. Therefore, the workpiece 100 fixed to the base plate 110 is placed at a predetermined position on the placement surface 11 by being supported by the support shafts 18*a* and 18*b*.

The stocker 20 is a stand that holds the workpiece 100 to be measured by the measuring device 10 in a stand-by state. On a top surface 21 of the stocker 20, a plurality of workpieces 100 are arranged at predetermined intervals in the longitudinal direction of the stocker 20 (the depth direction of the sheet of FIG. 2). The stocker 20 is provided away from the placement surface 11 of the measuring device 10. The workpiece 100 is located on the stocker 20 in a state of being fixed to the base plate 110.

The robot arm 25 is disposed between the measuring device 10 and the stocker 20, and has a function of carrying the workpiece 100 between the placement surface 11 of the measuring device 10 and the stocker 20. The robot arm 25 is an articulated robot, which can, for example, lift the base plate 110 from below with a tip 26 thereof to move the workpiece 100. Specifically, the robot arm 25 moves the workpiece 100 such that the base plate 110 of the workpiece 100 is placed on the support shafts 18*a* and 18*b*. The robot arm 25 delivers one workpiece 100 set on the stocker 20 onto the placement surface 11 to place the workpiece 100 at the predetermined position on the placement surface 11. Further, the robot arm 25 delivers the workpiece 100, after the measurement by the measuring device 10 is completed, back to the original position where the workpiece 100 was set on the stocker 20.

The imaging device 30 captures the object placed on the placement surface 11 (here, the workpiece 100 fixed to the base plate 110 by the clamp 120) together with the base plate 110. The imaging device 30 is provided to, for example, the moving mechanism 13 of the measuring device 10. The imaging device 30 captures the placement state of the workpiece 100 fixed to the base plate 110 on the placement surface 11 before the measuring device 10 measures the coordinates of the workpiece 100. It should be noted that, in FIG. 2, the imaging device 30 captures the workpiece 100 from directly above the workpiece 100, but the present disclosure is not limited thereto, and the imaging device 30 may capture the workpiece 100 from diagonally above. Further, only one imaging device 30 is shown in FIG. 2, but a plurality of imaging devices 30 may capture divided portions of the object if the object is large or complex in shape.

The control device 40 controls the operation of the foolproof system S. In the present embodiment, the control device 40 operates the robot arm 25 to move the workpiece 100 between the placement surface 11 and the stocker 20. Further, the control device 40 causes the movement mechanism 13 of the measuring device 10 to move the detection part 15 to measure the three-dimensional coordinates of the workpiece 100.

The details will be described later, but the control device 40 has the placement state of the workpiece 100 supported by the base plate 110 on the placement surface 11 captured, and causes a reporting part to report. Thus, the operator or the like can easily grasp whether or not the workpiece 100 is appropriately placed at the predetermined position on the placement surface 11.

<Configuration of Control Device>

Figure 3:
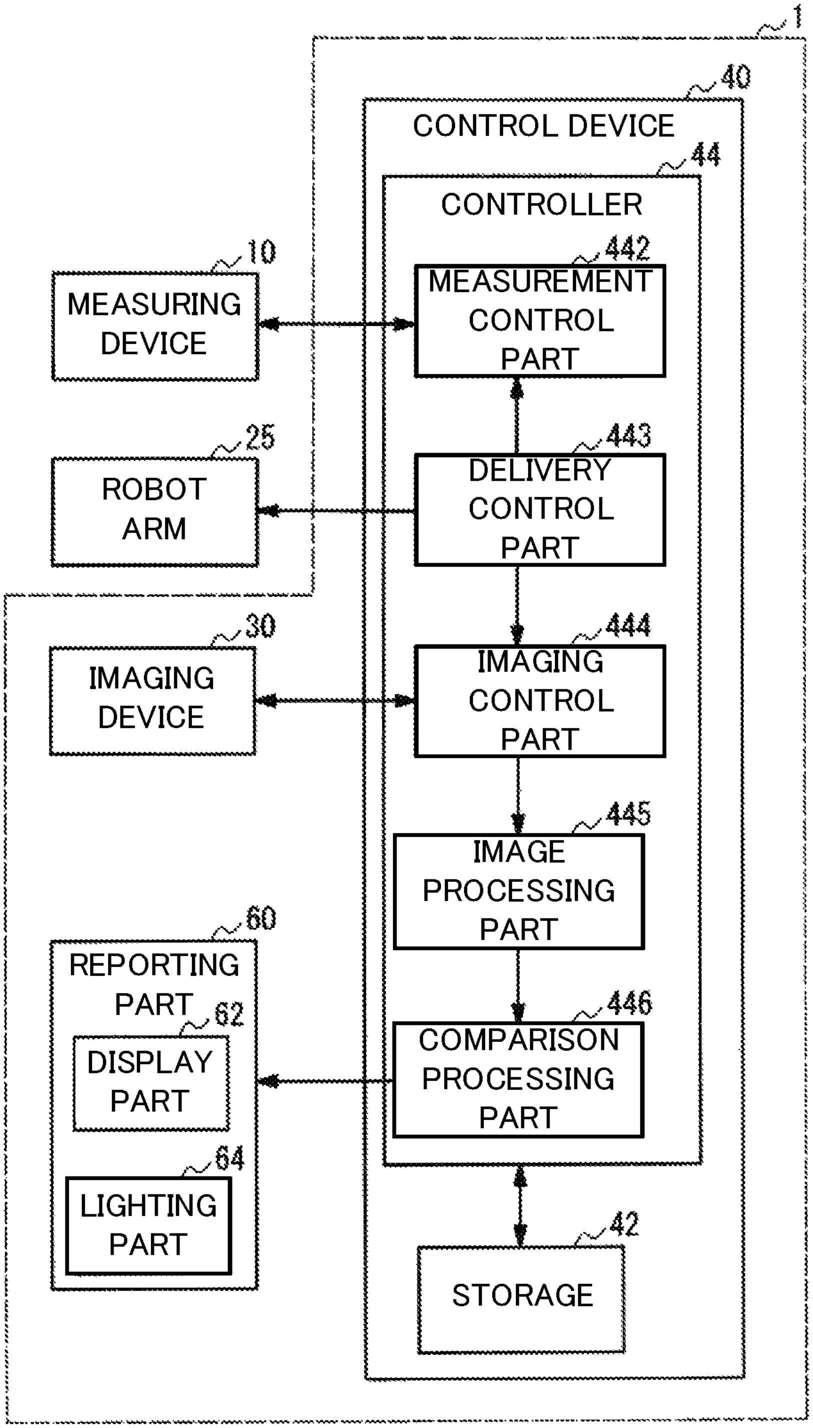
FIG. 3 is a block diagram illustrating a configuration of a control device 40.

FIG. 3 is a block diagram illustrating a configuration of the control device 40. In the present embodiment, the control device 40, the imaging device 30, and a reporting part 60 correspond to the foolproof device 1 provided to the manufacturing process. The control device 40 has a function of a Programmable Logic Controller (PLC) for controlling the operation of the measuring device 10 and the robot arm 25. Further, other than the function as the PLC, the control device 40 has a foolproof function that compares the placement state of the workpiece 100 supported by the base plate 110 on the placement surface 11, after image processing of the captured image of the placement state of the workpiece 100 on the placement surface 11, with a predetermined state, and causes the reporting part to report a result of the comparison. It should be noted that the control device 40 may be divided into a first device functioning as the PLC and a second device (for example, a computer) performing the foolproof function. Further, this second device may be shared, for example, with a computer of the measuring device 10. The control device 40 includes a storage 42 and a controller 44.

The storage 42 includes a Read Only Memory (ROM) storing a Basic Input Output System (BIOS) and the like of the computer and a Random Access Memory (RAM) serving as a work area. As the storage 42 thereof, a mass storage device such as a Hard Disk Drive (HDD) or Solid State Drive (SSD) can be used that stores an Operating System (OS), an application program, and various types of information referred to when executing said application program.

The controller 44 is a processor such as a Central Processing Unit (CPU) or a Graphics Processing Unit (GPU). The controller 44 functions as a measurement control part 442, a delivery control part 443, an imaging control part 444, an image processing part 445, and a comparison processing part 446 by executing the program stored in the storage 42.

The measurement control part 442 controls measurement of the workpiece 100 by the measuring device 10. Specifically, the measurement control part 442 causes the moving mechanism 13 of the measuring device 10 to move the detection part 15 to measure the three-dimensional coordinates of the workpiece 100 on the placement surface 11.

The delivery control part 443 controls delivery of the workpiece 100 by the robot arm 25. For example, when an operator selects the workpiece 100 to be measured from among the workpieces 100 on the stocker 20, the delivery control part 443 causes said workpiece 100 to be moved onto the placement surface 11. Further, when the measurement of the three-dimensional coordinates of the workpiece 100 is completed, the delivery control part 443 returns the workpiece 100 to its original position on the stocker 20.

The imaging control part 444 causes the imaging device 30 to capture the workpiece 100 placed on the placement surface 11 to generate a captured image. The imaging control part 444 causes the imaging device 30 to capture the workpiece 100 when one workpiece 100 among the plurality of workpieces 100 set at the standby position on the stocker 20 is carried and placed on the placement surface 11 of the measuring device 10 by the robot arm 25. The imaging control part 444 outputs the generated captured image to the image processing part 445.

The imaging control part 444 causes not only the workpiece 100, but also the base plate 110 and the clamp 120, to be captured. That is, in the present embodiment, the object to be captured by the imaging device 30 also includes the base plate 110 and the clamp 120. When the object is placed on the placement surface 11, the imaging control part 444 causes at least one of the imaging devices 30 to capture a plurality of mutually identifiable marks at a plurality of positions on the object to generate the captured image. Specifically, the imaging control part 444 causes the imaging device 30 to capture a plurality of first marks provided on the base plate 110 and a plurality of second marks provided on the lever 124 which is a movable portion of the clamp 120.

The first mark and the second mark are marks that enable detection of the three-dimensional coordinates of a portion where the marks are affixed. The first mark and the second mark are marks that enable the detection of the three-dimensional coordinates with the centers of the marks as the origins. Specifically, each of the first mark and the second mark is a mark that can construct a three-dimensional coordinate system in which XYZ axes are defined along the orientation of the mark while using the center of the mark as the origin with the single mark body by applying a dedicated image processing algorithm. When using the first mark and the second mark that enable the detection of the three-dimensional coordinates, a determination process described below can be used to determine whether or not the position of the workpiece 100 fixed to the base plate 110 or the state of fixation by the clamp 120 is out of the predetermined position. It should be noted that the first mark and the second mark are the same type of marks here, but the present disclosure is not limited thereto, and at least one of the size, shape, or type of the first mark and the second mark may be different from each other.

Figure 4:
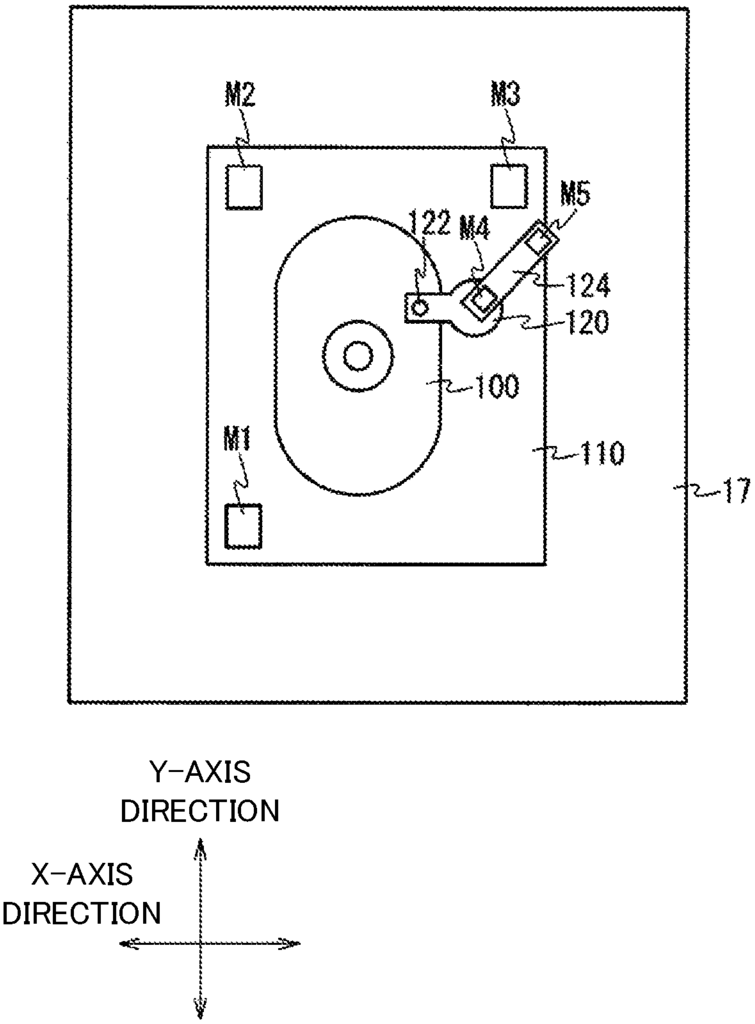
FIG. 4 is a schematic diagram illustrating a first mark and a second mark.

FIG. 4 is a schematic diagram illustrating the first mark and the second mark. In FIG. 4, first marks M1, M2, and M3 and second marks M4 and M5 are shown in a simplified manner for convenience of explanation, but the first marks M1 to M3 and the second marks M4 and M5 may have uniquely identifiable figures, patterns, symbols, letters, and the like printed on their surfaces. The first marks M1 to M3 and the second marks M4 and M5 may be marks whose orientations can be identified by means of the figures or the like printed on their surfaces. The plurality of first marks M1 to M3 are provided on a top surface of the base plate 110. The first marks M1 to M3 are affixed to the base plate 110 at positions not covered by the workpiece 100 or the clamp 120. Specifically, the first marks M1 to M3 are affixed to corners of the base plate 110. The plurality of second marks M4 and M5 are provided on the clamp 120. The second marks M4 and M5 are affixed to a top surface of the lever 124 of the clamp 120. Specifically, the second marks M4 and M5 are affixed to both ends of the lever 124 in the longitudinal direction.

It should be noted that the two second marks M4 and M5 are provided in FIG. 4, but the present disclosure is not limited thereto. For example, if a plurality of clamps 120 are provided to fix a large workpiece 100 to the base plate 110, the number of second marks to be captured by the imaging device 30 will increase because each of the plurality of clamps 120 has a plurality of second marks.

Before the workpiece 100 is placed on the placement surface 11, the imaging control part 444 causes the imaging device 30 to capture a plurality of reference marks provided to the fixing plate 17 to generate the captured image. Like the first marks M1 to M3 and the second marks M4 and M5, the reference mark is a mark enabling the detection of the three-dimensional coordinates with the center of the mark as the origin. Specifically, the reference mark is a mark making it possible to construct the three-dimensional coordinate system that defines the XYZ axes along the orientation of the mark while using the center of the mark as the origin with the single mark body by applying the dedicated image processing algorithm. The reference mark is a mark used for setting a reference coordinate system (X-axis, Y-axis, and Z-axis) when determining the coordinate positions of the first marks M1 to M3 and the second marks M4 and M5. The types of reference marks N1 to N4 are the same as the types of the first marks M1 to M3 and the second marks M4 and M5 here, but the present disclosure is not limited thereto, and a reference mark of which at least one of size, shape, and type is different from that of the first marks M1 to M3 and the second marks M4 and M5 may be used.

Figure 5:
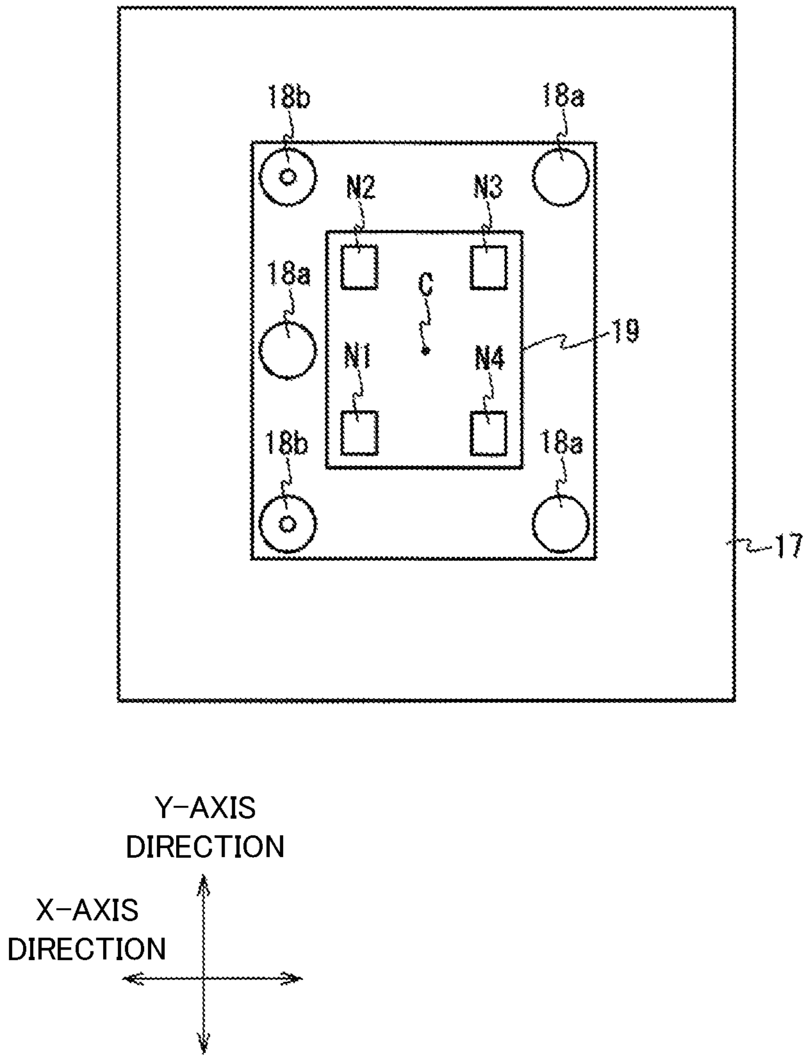
FIG. 5 is a schematic diagram illustrating a reference mark.

FIG. 5 is a schematic diagram illustrating the reference mark. In FIG. 5, the reference marks N1, N2, N3, and N4 are shown in a simplified manner for convenience of explanation, but the reference marks N1 to N4 may have uniquely identifiable figures, patterns, symbols, letters, and the like printed on their surfaces. The orientations of the reference marks N1 to N4 and their distances from a camera can be identified by means of the figures and the like printed on their surfaces. The plurality of uniquely identifiable reference marks N1 to N4 are provided at a central portion 19 of the fixing plate 17. The reference marks N1 to N4 are located closer to the center than the support axes 18*a* and 18*b* on the fixing plate 17. Therefore, while the support shafts 18*a* and 18*b* support the base plate 110, the reference marks N1 to N4 are hidden (see FIG. 4).

The image processing part 445 processes the captured image generated by the imaging device 30. The image processing part 445 sets the reference coordinate system from the captured image obtained by capturing the four reference marks N1 to N4. For example, the image processing part 445 identifies the positions of the four reference marks N1 to N4, and sets the reference coordinate system (X-axis, Y-axis, and Z-axis) with a center C (FIG. 5) of the four reference marks N1 to N4 as the origin. It should be noted that the image processing part 445 obtains the positions of the reference marks N1 to N4 (specifically, the center positions of the reference marks N1 to N4) from, for example, the coordinate positions in the coordinate system set in the imaging device 30.

The image processing part 445 stores information on the set reference coordinate system in the storage 42. By storing the information on the reference coordinate system in the storage 42 in this way, the image processing part 445 does not need to set the reference coordinate system again. It should be noted that the present disclosure is not limited to the above, and the image processing part 445 may set the reference coordinate system every time the measuring device 10 starts the measurement.

Further, the image processing part 445 obtains state data including the coordinate positions of the first marks M1 to M3 and the second marks M4 and M5 from at least one captured image including the first marks M1 to M3 and the second marks M4 and M5. Here, the image processing part 445 obtains the state data including the coordinate positions of the first marks M1 to M3 and the second marks M4 and M5 in the reference coordinate system set on the basis of the reference marks N1 to N4. For example, the image processing part 445 obtains the X-coordinate, the Y-coordinate, and the Z-coordinate of the center position of each of the first marks M1 to M3 and the second marks M4 and M5, in the reference coordinate system.

The image processing part 445 may obtain, as the state data, an angle formed by the second marks M4 and M5 provided on the lever 124, which is the movable portion, with a predetermined direction. Specifically, the image processing part 445 obtains an angle formed by a virtual line connecting the center of the second mark M4 and the center of the second mark M5 with respect to the X-axis direction of the reference coordinate system. In addition, the image processing part 445 may obtain, as the state data, a distance between the first marks M1 to M3 (specifically, a distance between the first mark M1 and the first mark M2, and a distance between the first mark M2 and the first mark M3) or a distance between the second mark M4 and the second mark M5.

It should be noted that when the robot arm 25 places the workpiece 100 on the placement surface 11, the workpiece 100 is not always placed on the placement surface 11 in the manner shown in FIG. 4. For example, the workpiece 100 may be placed on the placement surface 11 in a manner such as shown in FIG. 6 or FIG. 7.

Figure 6:
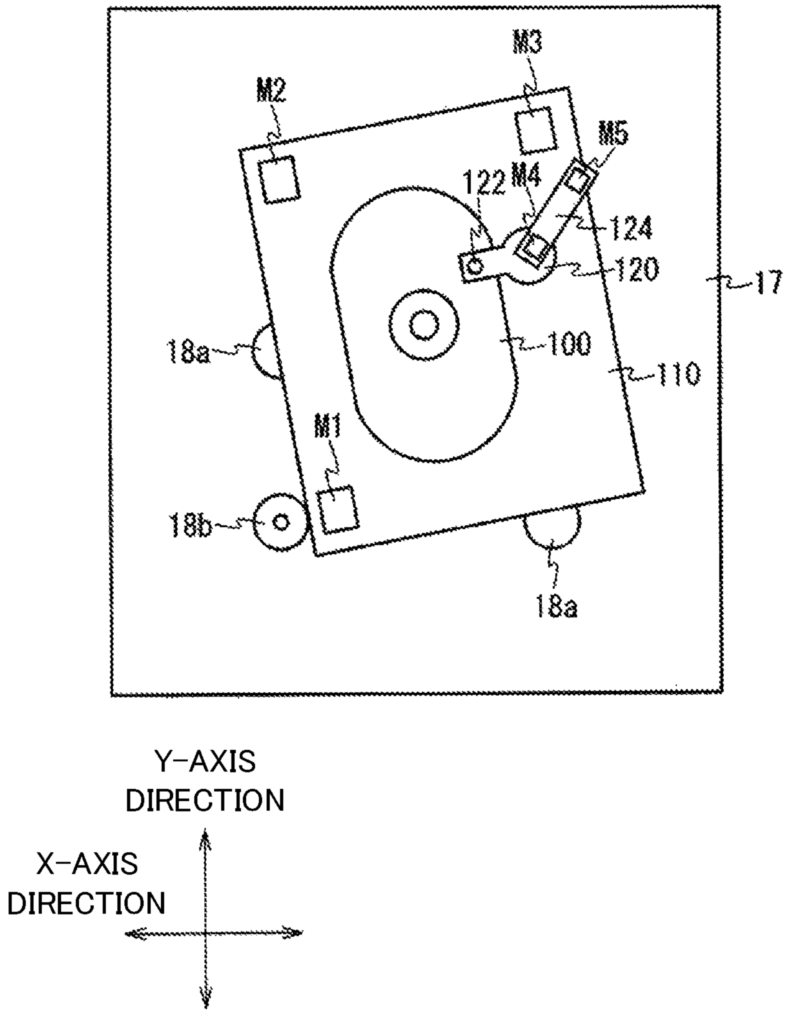
FIG. 6 schematically shows a state in which a base plate 110 to which the workpiece 100 is fixed is not appropriately supported by support shafts 18.

FIG. 6 schematically shows a state in which the base plate 110 to which the workpiece 100 is fixed is not appropriately supported by the support shafts 18*a* and 18*b*. Here, as one support shaft 18*b* is not engaged with a hole provided to the base plate 110 when the robot arm 25 places the base plate 110 on the support shafts 18*a* and 18*b*, the base plate 110 is in a state of being placed obliquely. In this case, the workpiece 100 is also in the state of being disposed obliquely.

Figure 7:
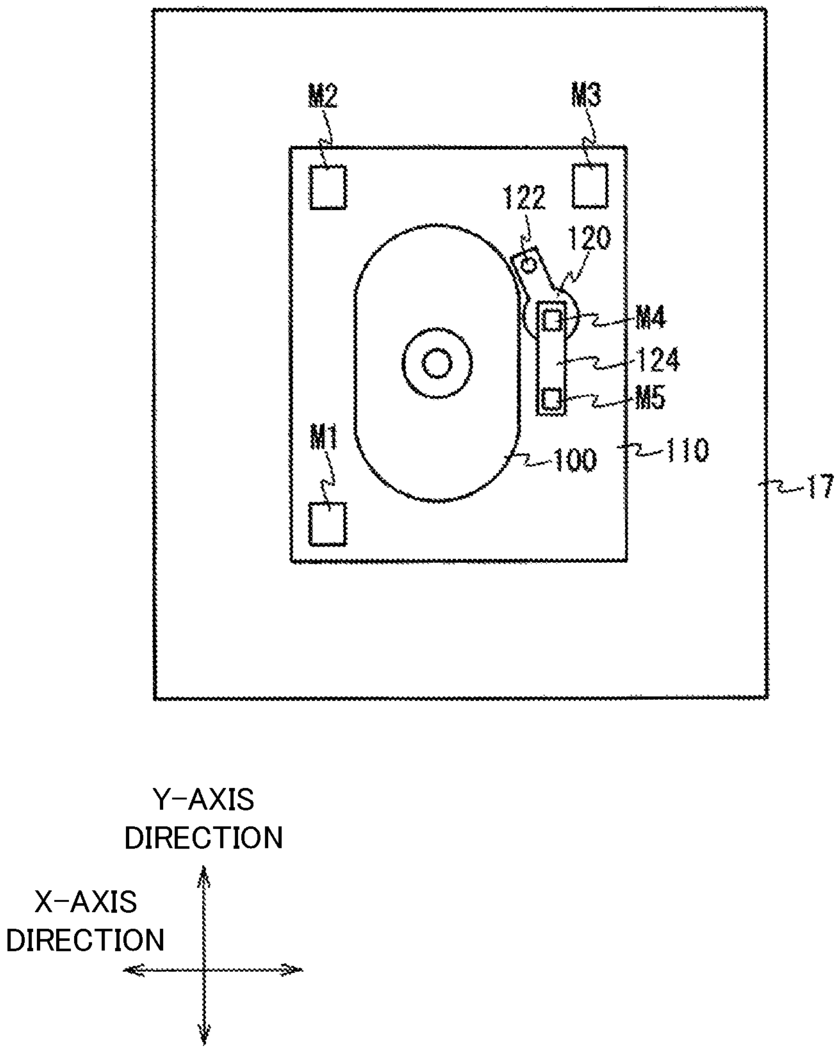
FIG. 7 schematically shows a state in which a clamp 120 does not fix the workpiece 100 to the base plate 110.

FIG. 7 schematically shows a state in which the clamp 120 does not fix the workpiece 100 to the base plate 110. Here, the operator fails to operate the lever 124 of the clamp 120 to move it from a standby position to a fixing position (position shown in FIG. 4), and so the lever 124 remains in the standby position and the fixing part 122 does not contact the workpiece 100, resulting in the workpiece 100 not being fixed to the base plate 110. In this case, the position of the workpiece 100 relative to the base plate 110 may deviate when the robot arm 25 moves the workpiece 100 together with the base plate 110 from the stocker 20 to the placement surface 11. In addition, the workpiece 100 on the base plate 110 may move due to contact between the detection part 15 of the measuring device 10 and the surface of the workpiece 100.

If the workpiece 100 is placed in the manner shown in FIG. 6 or 7, the measuring device 10 cannot measure the coordinates of the workpiece 100 with high accuracy, unlike when the workpiece 100 is placed in the manner shown in FIG. 4. Therefore, in the present embodiment, the first marks M1 to M3 and the second marks M4 and M5 are captured when the workpiece 100 is placed on the placement surface 11 to determine whether or not the workpiece 100 is placed at a normal position on the basis of a degree of deviation from the reference position, and a result of the determination is reported. Thus, the operator can easily grasp whether or not the measurement is performed in a state where the workpiece 100 is placed normally on the placement surface 11. The control device 40 includes a comparison processing part 446 to make the above determination and report.

The comparison processing part 446 compares the state data of the current first marks M1 to M3 and second marks M4 and M5 captured by the imaging device 30 with the reference data of the first marks M1 to M3 and the second marks M4 and M5 obtained in advance. The state data of the first marks M1 to M3 and the second marks M4 and M5 is data obtained from the captured image by the image processing part 445. On the other hand, the reference data includes the reference positions of the first marks M1 to M3 and the second marks M4 and M5 when the workpiece 100 is located at the predetermined position on the placement surface 11. The reference position means, for example, a coordinate position of each mark when the workpiece 100 is placed at the predetermined position as shown in FIG. 4. The reference data is stored in advance in the storage 42. The comparison processing part 446 compares the current coordinate position of each mark obtained by the image processing part 445 with the reference position of each mark stored in the storage 42, for example.

The comparison processing part 446 outputs the result of a comparison of the state data of the first marks M1 to M3 and the second marks M4 and M5 with the reference data. For example, the comparison processing part 446 outputs the result of the comparison to the reporting part 60 that reports the result of the comparison. A display part 62 and a lighting part 64 are provided as the reporting part 60.

The comparison processing part 446 determines whether or not the degree of deviation of the coordinate position indicated by the state data of each mark from the reference position indicated by the reference data exceeds a predetermined value, and causes the display part 62 to display the result of the determination. For example, if the current workpiece 100 being captured by the imaging device 30 is placed normally on the placement surface 11, the coordinate positions of the first marks M1 to M3 and the second marks M4 and M5 (coordinate positions of the X-axis, Y-axis, and Z-axis) are located almost at the same positions as the reference positions (coordinate position of each mark when the workpiece 100 is placed in position as shown in FIG. 4) and barely deviate from the reference positions. Therefore, the comparison processing part 446 determines that the degree of deviation of the current coordinate position of each mark from the reference position (amount of positional deviation) is below the predetermined value (for example, 5 mm) and causes the display part 62 to display the result of the determination.

On the other hand, as shown in FIG. 6 or FIG. 7, if the workpiece 100 is not placed normally on the placement surface 11, the coordinate positions of the first marks M1 to M3 and the second marks M4 and M5 (coordinate positions of the X-axis, Y-axis, and Z-axis) are located away from the reference positions (coordinate position of each mark when the workpiece 100 is placed in position as shown in FIG. 4) and deviate significantly from the reference positions. Therefore, the comparison processing part 446 determines that the degree of deviation of the current coordinate position of each mark from the reference position exceeds the predetermined value, and causes the display part 62 to display the result of the determination. By displaying the result of the determination on the display part 62 as described above, it is possible to easily determine whether or not the workpiece 100 is placed normally on the placement surface 11.

Further, the comparison processing part 446 may compare an angle that the current second marks M4 and M5 form with respect to the X-axis direction of the reference coordinate system (hereinafter also referred to as the current angle) to a reference angle of the second marks M4 and M5 obtained in advance (an angle that the second marks M4 and M5 form with respect to the X-axis direction when the workpiece 100 is placed in place as shown in FIG. 4). It should be noted that the current angle and the reference angle are angles formed by the virtual line connecting the center of the second mark M4 and the center of the second mark M5 with respect to the X-axis direction. If the clamp 120 is in the fixing position (FIG. 4) and there is almost no difference between the size of the current angle and the size of the reference angle, the comparison processing part 446 determines that the degree of deviation of the current angle from the reference angle is equal to or below a predetermined value (for example, ±5°) and causes the display part 62 to display the result of the determination. On the other hand, if the clamp 120 is in the standby position (FIG. 7) and the difference between the size of the current angle and the size of the reference angle is large, the comparison processing part 446 determines that the degree of deviation of the current angle from the reference angle exceeds the predetermined value and causes the display part 62 to display the result of the determination. By displaying the result of the determination as described above, it is easy to determine whether or not the clamp 120 is operated to be at the fixing position and the workpiece 100 is appropriately fixed.

It should be noted that, in the above description, the current angle and the reference angle are angles formed by the virtual line connecting the second marks M4 and M5 with respect to the X-axis direction of the reference coordinate system. For example, the X-axis direction may be the X-axis direction of the coordinate system constructed by the first marks M1 to M3.

Figure 8:
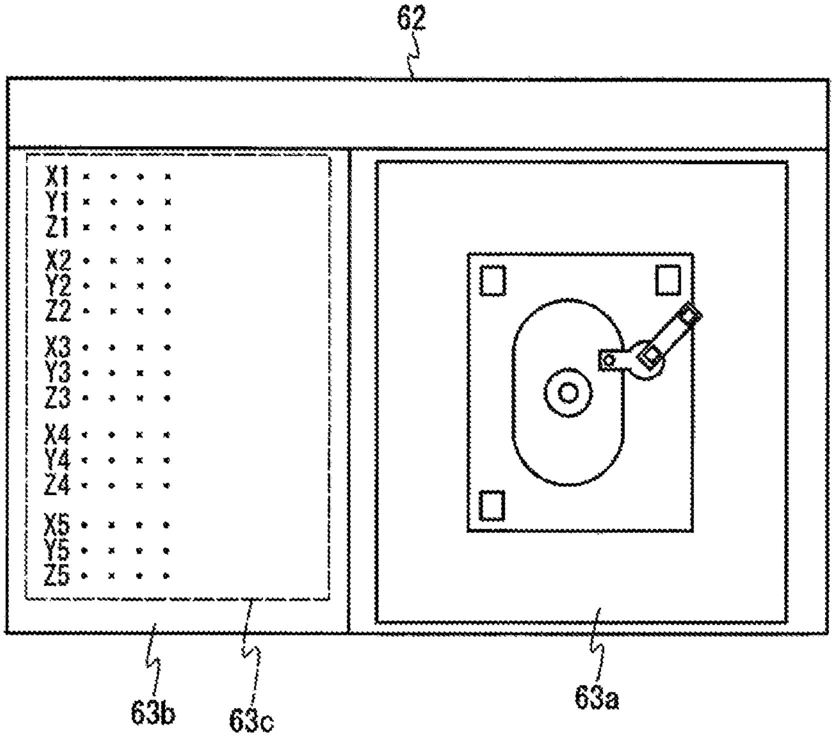
FIG. 8 schematically shows a display example on a display part 62.

FIG. 8 schematically shows a display example on the display part 62. The display part 62 is disposed at a position that the operator can easily see, which is, for example, at a side of the measuring device 10. The display part 62 displays the image captured by the imaging device 30. Further, the display part 62 displays information indicating the placement state of the workpiece 100 on the placement surface 11. The display part 62 includes an image display area 63*a* and a coordinate display area 63*b*. The image display area 63*a* is an area for displaying the image captured by the imaging device 30. The image display area 63*a* displays the workpiece 100 placed on the placement surface 11 (specifically, the workpiece 100 being fixed to the base plate 110 by the clamps 120). The operator can easily recognize that the workpiece 100 is being placed by looking at the image displayed in the image display area 63*a*. Further, the operator can easily recognize the first marks M1 to M3 provided on the base plate 110 and the second marks M4 and M5 provided on the clamp 120.

The coordinate display area 63*b* is an area for displaying the coordinates of the first marks M1 to M3 and the second marks M4 and M5. For example, the three-dimensional coordinate position of the first mark M1 is denoted by X1, Y1, and Z1, and the three-dimensional coordinate position of the second mark M4 is denoted by X4, Y4, and Z4. Further, the comparison processing part 446 changes the display mode of the coordinate display area 63*b* depending on whether or not the degree of deviation of the positions of the first marks M1 to M3 and the second marks M4 and M5 from the reference positions is equal to or less than the predetermined value. Here, the comparison processing part 446 displays characters in an area 63*c* in the coordinate display area 63*b* in green if the degree of deviation is equal to or less than the predetermined value (if the workpiece 100 is placed normally as shown in FIG. 4), and displays the characters in the area 63*c* in the coordinate display area 63*b* in red if the degree of deviation is greater than the predetermined value (if the workpiece 100 is not placed normally, such as shown in FIG. 6 or FIG. 7). Thus, the operator can instantly determine whether the workpiece 100 is placed normally or not by looking at the display color in the area 63*c* in the coordinate display area 63*b*.

It should be noted that the angle formed by the virtual line connecting the second marks M4 and M5 with respect to the X-axis direction may be displayed in the coordinate display area 63*b*. Thus, the operator can check whether the lever 124 with the second marks M4 and M5 is in the fixing position (position shown in FIG. 4) or not. That is, the operator can check whether or not the workpiece 100 is appropriately fixed to the base plate 110 by the clamp 120.

The comparison processing part 446 causes a first report indicating that the workpiece 100 is located at the predetermined position on the placement surface 11 in a predetermined manner or a second report indicating that the workpiece 100 is not located in the predetermined manner to be reported. Specifically, the comparison processing part 446 causes the lighting part 64 to light up in a manner indicating the first report or to light up in a manner indicating the second report, when the workpiece 100 is returned to the stocker 20 after measurement.

Figure 9:
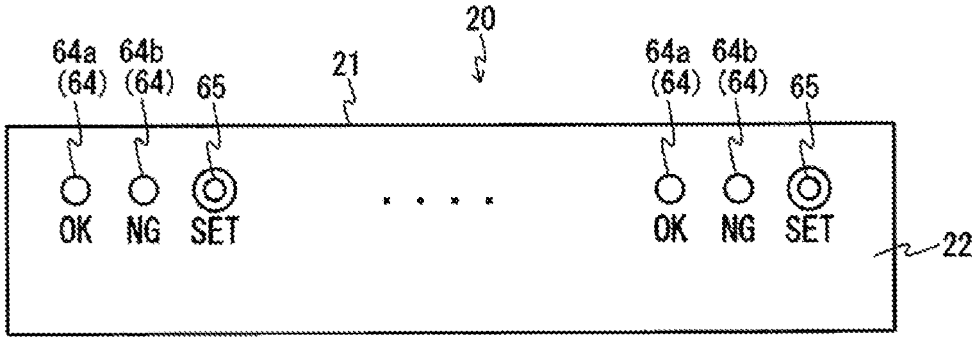
FIG. 9 is a schematic diagram illustrating an example of lighting by a lighting part 64.

FIG. 9 is a schematic diagram illustrating an example of lighting by the lighting part 64. It should be noted that the workpiece 100 is set on the top surface 21 of the stocker 20, but the workpiece 100 is omitted in FIG. 9 for convenience of explanation. The lighting part 64 is provided for each workpiece 100. The lighting part 64 includes a first lighting part 64*a* that makes the first report and a second lighting part 64*b* that makes the second report. The first lighting part 64*a* and the second lighting part 64*b* are disposed on a side surface 22 of the stocker 20 so as to be easily checked by the operator. The side surface 22 is provided with a set button 65 which can be pressed down, and the workpiece 100 whose set button 65 is pressed down is moved onto the placement surface 11 by the robot arm 25 for measurement.

The first lighting part 64*a* lights up if the workpiece 100 is located at the predetermined position in the predetermined manner, for example as shown in FIG. 4. The second lighting part 64*b* lights up if the workpiece 100 is not located in the predetermined manner, as shown in FIG. 6 or FIG. 7. The comparison processing part 446 causes the first lighting part 64*a* or the second lighting part 64*b* to light up when the robot arm 25 returns the workpiece 100, for which measurement has been completed, to the stocker 20. The first lighting part 64*a* or the second lighting part 64*b* is being lit as described above, and so the operator can easily determine whether the workpiece 100 has been appropriately measured or not.

It should be noted that, in the above, it was assumed that the lighting part 64 includes the first lighting part 64*a* and the second lighting part 64*b*, but the present disclosure is not limited thereto, and the comparison processing part 446 may make the first report and the second report with a single lighting part. For example, the comparison processing part 446 makes the lighting color for reporting the first report different from the lighting color for reporting the second report.

<Flow of Measurement Process of Workpiece>

Figure 10:
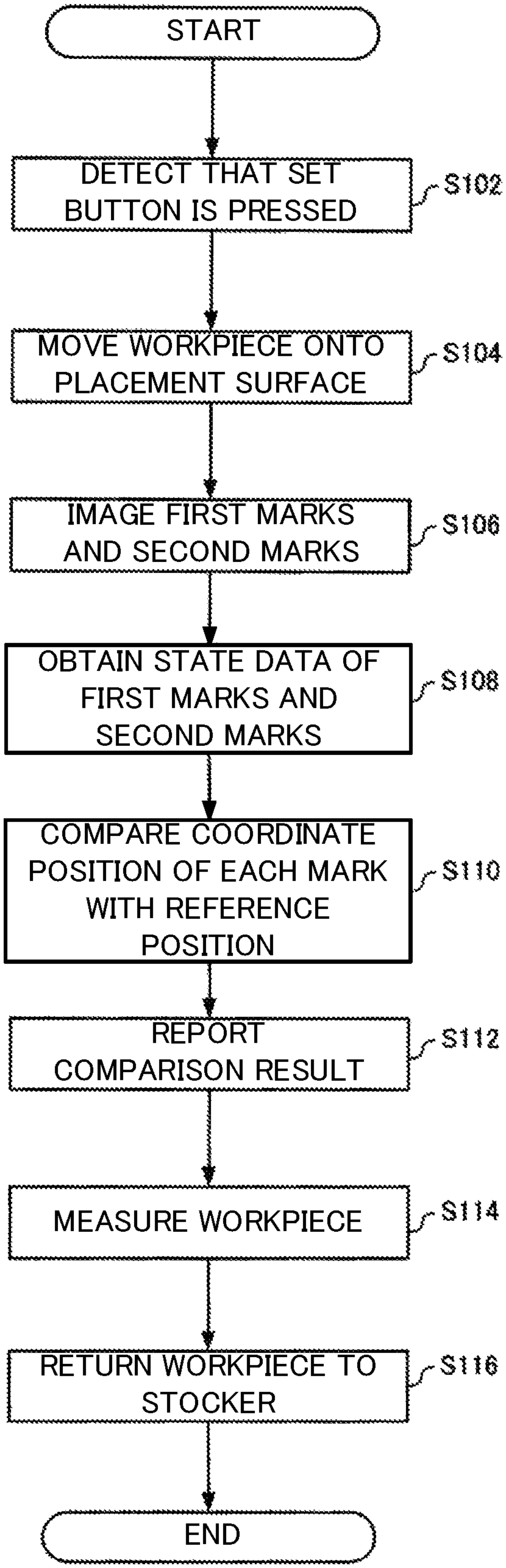
FIG. 10 is a flowchart showing a measurement process of the workpiece 100.

FIG. 10 is a flowchart showing a measurement process of the workpiece 100. The process shown in FIG. 10 is achieved by the control device 40 by reading and executing the program stored in the storage 42. It should be noted that the program may be downloaded from an external server or the like.

The flowchart in FIG. 10 starts when the control device 40 detects that the operator presses the set button 65 after placing the workpiece 100 on the stocker 20 (step S102).

Next, the delivery control part 443 of the control device 40 controls the robot arm 25 to move the workpiece 100 whose set button 65 is pressed down, from the stocker 20 to the predetermined position on the placement surface 11 (step S104). Specifically, the robot arm 25 moves the base plate 110 to which the workpiece 100 is fixed by the clamp 120 onto the placement surface 11.

Next, the imaging control part 444 causes the imaging device 30 to capture the first marks M1 to M3 and the second marks M4 and M5 when the workpiece 100 fixed to the base plate 110 is placed on the placement surface 11 (step S106). That is, the imaging device 30 captures the first marks M1 to M3 provided on the base plate 110 and the second marks M4 and M5 provided on the clamp 120 to generate the captured image.

Next, the image processing part 445 obtains the state data including the coordinate positions of the first marks M1 to M3 and the second marks M4 and M5 from the generated captured image (step S108). For example, the image processing part 445 obtains the three-dimensional coordinate positions of the first marks M1 to M3 and the second marks M4 and M5 in the reference coordinate system. The reference coordinate system is coordinate axes set on the basis of the reference marks N1 to N4 captured by the imaging device 30 in advance, which is stored in the storage 42.

Next, the comparison processing part 446 compares the obtained coordinate positions of the first marks M1 to M3 and the second marks M4 and M5 with the reference positions of the first marks M1 to M3 and the second marks M4 and M5 stored in the storage 42 (step S110). For example, the comparison processing part 446 obtains the degree of deviation of the coordinate positions of the first marks M1 to M3 and the second marks M4 and M5 relative to the reference positions.

Next, the comparison processing part 446 causes the reporting part 60 to report the result of the comparison made in step S110 (step S112). For example, the display part 62, which is the reporting part 60, displays whether or not the positions of the first marks M1 to M3 and the second marks M4 and M5 are appropriate. Specifically, the display 62 differs between the display color of the screen when the workpiece 100 is placed normally and the display color of the screen when the workpiece 100 is not placed normally. The operator can easily understand whether or not the workpiece 100 is placed normally by looking at the screen displayed on the display part 62.

Next, the measurement control part 442 controls the measuring device 10 to measure the workpiece 100 placed on the placement surface 11 (step S114). Specifically, the measurement control part 442 causes the coordinates of the workpiece 100 to be measured while bringing the surface of the workpiece 100 into contact with the detection part 15 of the measurement device 10 when the workpiece 100 is placed normally on the placement surface 11. It should be noted that the measurement control part 442 does not allow the coordinates of the workpiece 100 to be measured if the workpiece 100 is not placed normally on the placement surface 11.

Next, the delivery control part 443 controls the robot arm 25 to return the workpiece 100 placed on the placement surface 11 to the stocker 20 (step S116). Specifically, the robot arm 25 returns the workpiece 100 to a position where it had been before the workpiece 100 was delivered in step S104. After the workpiece 100 returns to the stocker 20, the comparison processing part 446 causes the lighting part 64 to light up. For example, if the workpiece 100 is placed normally on the placement surface 11, the first lighting part 64*a* performs the first lighting, and if the workpiece 100 is not placed normally on the placement surface 11, the second lighting part 64*b* performs the second lighting. Thus, the operator can easily check whether the workpiece 100 has been measured appropriately by looking at the first lighting or the second lighting.

Effects of the Present Embodiment

The foolproof device 1 of the above embodiment causes an imaging device 30 to capture an object (the workpiece 100 fixed to the base plate 110 by the clamp 120) on which a plurality of identifiable first marks M1 to M3 and second marks M4 and M5 are provided, and obtains the state data including the coordinate position of each mark from the captured image captured by the imaging device 30. Then, the foolproof device 1 compares the current state data of each mark obtained with the reference data including the reference position of each mark stored in the storage 42, and outputs the result of the comparison concerning the first marks M1 to M3 and the second marks M4 and M5 to the reporting part 60.

Thus, the operator and the like can easily grasp whether the workpiece 100 has been appropriately placed and measured at the predetermined position on the placement surface 11 by checking the result of the comparison outputted to the reporting part 60.

The present disclosure is explained on the basis of the exemplary embodiments. The technical scope of the present disclosure is not limited to the scope explained in the above embodiments and it is possible to make various changes and modifications within the scope of the disclosure. For example, all or part of the apparatus can be configured with any unit which is functionally or physically dispersed or integrated. Further, new exemplary embodiments generated by arbitrary combinations of them are included in the exemplary embodiments of the present disclosure. Further, effects of the new exemplary embodiments brought by the combinations also have the effects of the original exemplary embodiments.

What is claimed is:

1. A foolproof device provided to a manufacturing process, comprising:

an imaging part that captures an object placed on a placement surface of a measuring device, the object including a workpiece that is measured by the measuring device, a base part supported on the placement surface, and a movable portion on which two identifiable marks are provided, the movable portion fixes a workpiece to the base part; and a control device, including at least a processor and a storage, configured to:

obtain state data including coordinate positions of the two identifiable marks and an angle formed by the two identifiable marks with respect to a predetermined direction from at least one captured image captured by the imaging part;

store reference data, the reference data including reference positions of the two identifiable marks and a reference angle formed by the two identifiable marks with respect to the predetermined direction; and compare the reference data stored in the storage with the current state data obtained, and output a result of the comparison regarding at least the two identifiable marks.

2. The foolproof device according to claim 1, wherein the control device is further configured to:

store a reference coordinate system set by capturing a plurality of pieces of reference data provided on a placement surface on which the object is placed, and obtain state data including a coordinate position of each reference mark in the reference coordinate system.

3. The foolproof device according to claim 1, wherein the object includes the base part with a first identifiable mark provided on a main surface, and the control device is further configured to obtain the state data of the first identifiable mark from the captured image including the first identifiable mark.

4. The foolproof device according to claim 2, wherein the object includes the movable portion, on which a second identifiable mark is provided, the movable portion being provided movably with respect to the base part, and the control device is further configured to obtain the state data of the second identifiable mark from the captured image including the second identifiable mark.

5. The foolproof device according to claim 4, wherein the object includes a base plate that supports the workpiece, and a clamp that fixes the workpiece to the base plate, and the movable portion is a lever that is provided to the clamp and is movable with respect to the base plate.

6. The foolproof device according to claim 2, wherein the control device is further configured to obtain the state data further including at least a distance between the two identifiable marks.

7. The foolproof device according to claim 1, wherein the control device is further configured to compare the reference data with the state data, and causes a display to report a placement state of the object on the placement surface.

8. The foolproof device according to claim 7, wherein the control device is further configured to determine whether or not a degree of deviation of a coordinate position indicated by the state data with respect to a reference position indicated by the reference data exceeds a predetermined value, and causes the display to display a result of the determination.

9. The foolproof device according to claim 7, wherein the control device is further configured to cause a first report indicating that the object is located at a predetermined position on the placement surface in a predetermined manner or a second report indicating that the object is not located in the predetermined manner to be reported.

10. The foolproof device according to claim 7, wherein when one object out of the plurality of objects set in a standby position is moved by a delivering device and placed on the placement surface of the measuring device, the imaging part captures the two identifiable marks of the one object.

11. The foolproof device according to claim 1, wherein each of the two identifiable marks is an identifiable mark capable of constructing a three-dimensional coordinate system with three axial directions orthogonal to each other, whose origin is a center of the identifiable mark.

12. A non-transitory storage medium storing a program for causing a processor to:

cause an imaging part to capture an object placed on a placement surface of a measuring device, the object including a workpiece that is measured by the measuring device, a base part supported on the placement surface, and a movable portion on which two identifiable marks are provided, the movable portion fixes a workpiece to the base part;

obtain state data including coordinate positions of the two identifiable marks and an angle formed by the two identifiable marks with respect to a predetermined direction from at least one captured image captured by the imaging part; and compare reference data including a reference position of each identifiable mark stored in a storage with the current state data obtained and outputting a result of the comparison regarding at least the two identifiable marks.

* * * * *